US011984705B2

(12) United States Patent
Kanakasabai et al.

(10) Patent No.: US 11,984,705 B2
(45) Date of Patent: May 14, 2024

(54) SYSTEM AND METHOD FOR SPARK PLUG IDENTIFICATION AND ENGINE MONITORING

(71) Applicant: AI ALPINE US BIDCO INC., Wilmington, DE (US)

(72) Inventors: Viswanathan Kanakasabai, Bangalore (IN); Suma Memana Narayana Bhat, Bangalore (IN); Markus Kraus, Wiesing (AT); Thomas Martin Mai, Munster (AT)

(73) Assignee: AI ALPINE US BIDCO INC., Wilmington, DE (US)

( * ) Notice: Subject to any disclaimer, the term of this patent is extended or adjusted under 35 U.S.C. 154(b) by 333 days.

(21) Appl. No.: 17/415,668

(22) PCT Filed: Dec. 20, 2018

(86) PCT No.: PCT/US2018/066623

§ 371 (c)(1),
(2) Date: Jun. 17, 2021

(87) PCT Pub. No.: WO2020/131055

PCT Pub. Date: Jun. 25, 2020

(65) Prior Publication Data

US 2022/0077660 A1 Mar. 10, 2022

(51) Int. Cl.
*H01T 13/04* (2006.01)
*F02P 13/00* (2006.01)
(Continued)

(52) U.S. Cl.
CPC .............. *H01T 13/04* (2013.01); *F02P 13/00* (2013.01); *F02P 17/12* (2013.01); *H01T 13/20* (2013.01); *H01T 13/44* (2013.01); *H01T 13/58* (2013.01)

(58) Field of Classification Search
CPC ......... H01T 13/04; H01T 13/20; H01T 13/44; H01T 13/58; F02P 13/00; F02P 17/12
See application file for complete search history.

(56) References Cited

U.S. PATENT DOCUMENTS 4,224,570 A * 9/1980 Meserow ................ G01P 3/486 324/402
4,412,151 A * 10/1983 Norris ..................... H01T 13/40 313/118

(Continued)

FOREIGN PATENT DOCUMENTS

DE 102004042101 A1 3/2006
JP 5792435 B2 10/2015
WO 2012065764 A1 5/2012

OTHER PUBLICATIONS

Bae et al., "An interferometricfiber optic sensor embedded in a spark plug for in-cylinder pressure measurement in engines", 2002 15th Optical Fiber Sensors Conference Technical Digest. OFS 2002(Cat. No. 02EX533), vol. 1, pp. 419-422, Portland, USA, May 2002.

(Continued)

*Primary Examiner* — Abdullah A Riyami
*Assistant Examiner* — Thang H Nguyen
(74) *Attorney, Agent, or Firm* — Fletcher Yoder, P.C.

(57) ABSTRACT

A spark plug assembly includes a spark plug, where the spark plug includes a high voltage connector, an insulator body, a metallic shell, and an electrical conductor at least partly disposed in the insulator body and the metallic shell. The spark plug assembly includes a detection unit having a transmitter device and a receiver device. The transmitter device is coupled to the spark plug and is electrically disposed between the high voltage connector and the electrical conductor. Further, the transmitter device is configured to draw an excitation current from the electrical conductor.

(Continued)

The transmitter device includes an optical signal generator that is configured to generate an optical signal in response to the drawn excitation current. The receiver device is disposed in optical communication with the transmitter device and configured to receive the optical signal from the transmitter device.

23 Claims, 6 Drawing Sheets

(51) Int. Cl.

| | |
|---|---|
| ***F02P 17/12*** | (2006.01) |
| ***H01T 13/20*** | (2006.01) |
| ***H01T 13/44*** | (2006.01) |
| ***H01T 13/58*** | (2020.01) |

(56) References Cited

U.S. PATENT DOCUMENTS 4,658,774 A * 4/1987 Kashima ................. H01T 13/22 123/169 EL
5,208,541 A * 5/1993 Yerkovich ............... F02P 17/12 324/393
5,371,436 A * 12/1994 Griswold ................ H01T 13/04 123/143 B
5,477,148 A * 12/1995 Miyata ..................... F02P 11/06 324/393
6,741,925 B2 * 5/2004 Masters ..................... B25J 9/16 324/378
7,022,968 B1 4/2006 Hopper et al.
7,420,662 B2 9/2008 Yalin et al.
8,146,553 B2 * 4/2012 Herden ................... F02P 17/12 123/143 B
8,384,277 B2 2/2013 Yamada et al.
9,255,565 B2 2/2016 Martin et al.
9,316,201 B2 4/2016 Gruber
9,702,333 B1 * 7/2017 Bell ........................ F02P 15/08
2001/0056323 A1 * 12/2001 Masters ..................... B25J 9/16 324/378
2002/0013654 A1 * 1/2002 Masters ..................... B25J 9/16 701/115
2005/0150301 A1 * 7/2005 Skinner ................. F02P 19/028 73/714
2013/0298863 A1 11/2013 Nuebel et al.
2015/0198134 A1 7/2015 Martin et al.
2017/0284358 A1 * 10/2017 Skowronek ............. F02P 17/12
2018/0142664 A1 * 5/2018 Assaad ................... H01T 13/22
2019/0301423 A1 * 10/2019 Petruska ................. F02P 17/10
2021/0332783 A1 * 10/2021 Hastall ..................... F02P 11/06

OTHER PUBLICATIONS

PCT International Search Report and Written Opinion; Application No. PCT/US2018/066623; dated Sep. 9, 2019; 13 pages.

* cited by examiner

SYSTEM AND METHOD FOR SPARK PLUG IDENTIFICATION AND ENGINE MONITORING

CROSS-REFERENCE TO RELATED APPLICATION

This application is a National Stage entry from, and claims benefit of, PCT Application No. PCT/US2018/066623, filed on Dec. 20, 2018; entitled "System and Method for Spark Plug Identification and Engine Monitoring", which is herein incorporated by reference in its entirety.

BACKGROUND

Embodiments of the present specification relate to a system and method for spark plug identification and engine monitoring, and more particularly, embodiments of the present specification relate to a spark plug assembly having a detection unit.

Generally, internal combustion (IC) engines are used in applications such as transportation, electricity generation, and the like. Unexpected breakdown of such engines hinders normal operations and adversely effects productivity. The IC engines are typically ignited using a spark produced by a spark plug. Spark plugs are vital for engine performance as the spark plugs provide sparks to ignite and burn the air-fuel mixture compressed in a cylinder of an IC engine. As will be appreciated, the spark plugs are parts that are subject to wear and tear and need to be serviced and replaced frequently. During replacement of a spark plug, an existing authentic spark plug needs to be replaced by another authentic spark plug. Replacing an authentic spark plug with a counterfeit spark plug adversely effects engine performance and may even cause irreversible damage to the engine. By way of example, installing a counterfeit spark plug may result in decreased efficiency, increased emissions from the engine, and the like.

Further, it is desirable to at least intermittently assess health of engines, to assist in diagnostics and/or prognostics of engine failures, and monitoring operations of the engines.

BRIEF DESCRIPTION

In one embodiment, a spark plug assembly includes a spark plug, where the spark plug includes a high voltage connector disposed at one end of the spark plug and an insulator body having a first side and a second side. The insulator body is coupled to the high voltage connector at the first side. Further, the spark plug includes a metallic shell having a first side and a second side, where the first side of the metallic shell is coupled to the second side of the insulator body. The spark plug also includes an electrical conductor at least partly disposed in the insulator body and the metallic shell. The spark plug assembly includes a detection unit having a transmitter device and a receiver device. The transmitter device is coupled to the spark plug and is electrically disposed between the high voltage connector and the electrical conductor. The transmitter device is configured to draw an excitation current from the electrical conductor. The transmitter device includes an optical signal generator, where the optical signal generator is configured to generate an optical signal in response to the drawn excitation current. The receiver device is disposed in optical communication with the transmitter device and configured to receive the optical signal from the transmitter device.

In another embodiment, an engine includes one or more ignition modules, where each ignition module includes one or more ignition coils and one or more spark plug assemblies. The spark plug assemblies are coupled to respective ignition coils, where at least one of the one or more spark plug assemblies include a spark plug. The spark plug includes a high voltage connector disposed at one end of the spark plug, an insulator body having a first side and a second side, and a metallic shell having a first side and a second side, where the first side of the metallic shell is coupled to the second side of the insulator body. Further, the insulator body is coupled to the high voltage connector at the first side. The spark plug also includes an electrical conductor at least partly disposed in the insulator body and the metallic shell. The spark plug assembly includes a detection unit having a transmitter device and a receiver device. The transmitter device is coupled to the spark plug and electrically disposed between the high voltage connector and the electrical conductor. The transmitter device is configured to draw an excitation current from the electrical conductor. Further, the transmitter device includes an optical signal generator, where the optical signal generator is configured to generate an optical signal in response to the drawn excitation current. The receiver device is disposed in optical communication with the transmitter device and configured to receive the optical signal from the transmitter device.

In yet another embodiment, a method includes powering a transmitter device disposed in a spark plug using harvested energy from an electrical conductor of a spark plug. The method further includes transmitting an optical signal using the transmitter device, and receiving the optical signal using a receiver device, where the optical signal is representative of an identification parameter of the spark plug, or a diagnostic parameter of an engine, or both. The method also includes determining a control action based on the optical signal and initiating the control action for the engine.

In another embodiment, a kit includes a detection unit, where the detection unit comprises a transmitter device and a receiver device. The transmitter device is configured to be coupled to a spark plug, where the transmitter device is configured to be electrically disposed between a high voltage connector and an electrical conductor. Further, the transmitter device includes an optical signal generator, where the optical signal generator is configured to generate an optical signal in response to the drawn excitation current. The receiver device is configured to be disposed in optical communication with the transmitter device. Further, the receiver device is configured to receive the optical signal from the transmitter device.

DRAWINGS

These and other features and aspects of embodiments of the invention will become better understood when the following detailed description is read with reference to the accompanying drawings in which like characters represent like parts throughout the drawings, wherein.

Figure 4:
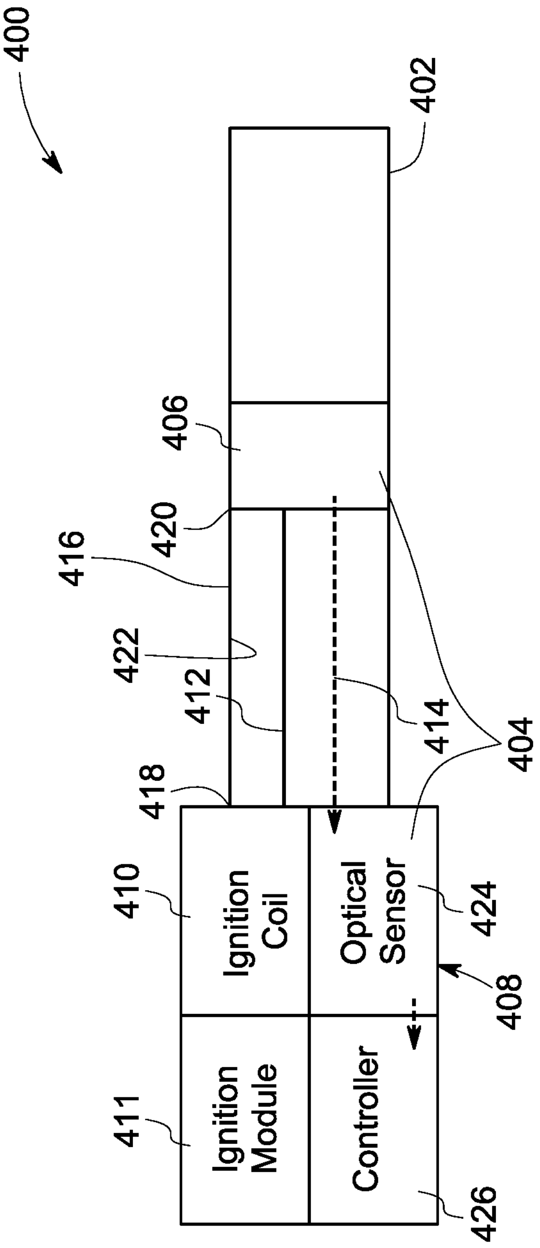
FIG. 4 is a diagrammatical representation of a spark plug assembly having a transmitter device of a detection unit coupled to a spark plug, and a receiver device of the detection unit coupled to an ignition coil, in accordance with aspects of the present specification.
Figure 5:
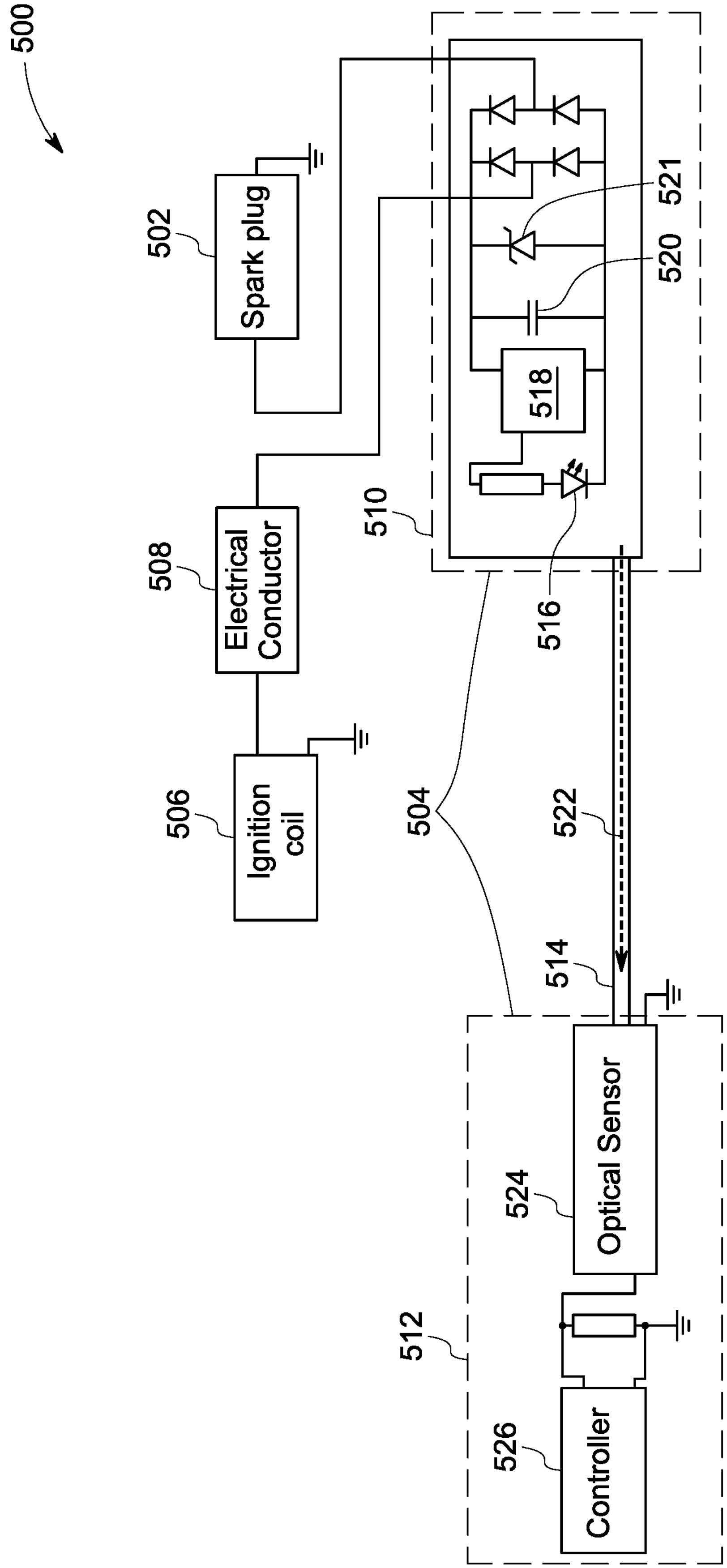
Figure 6:
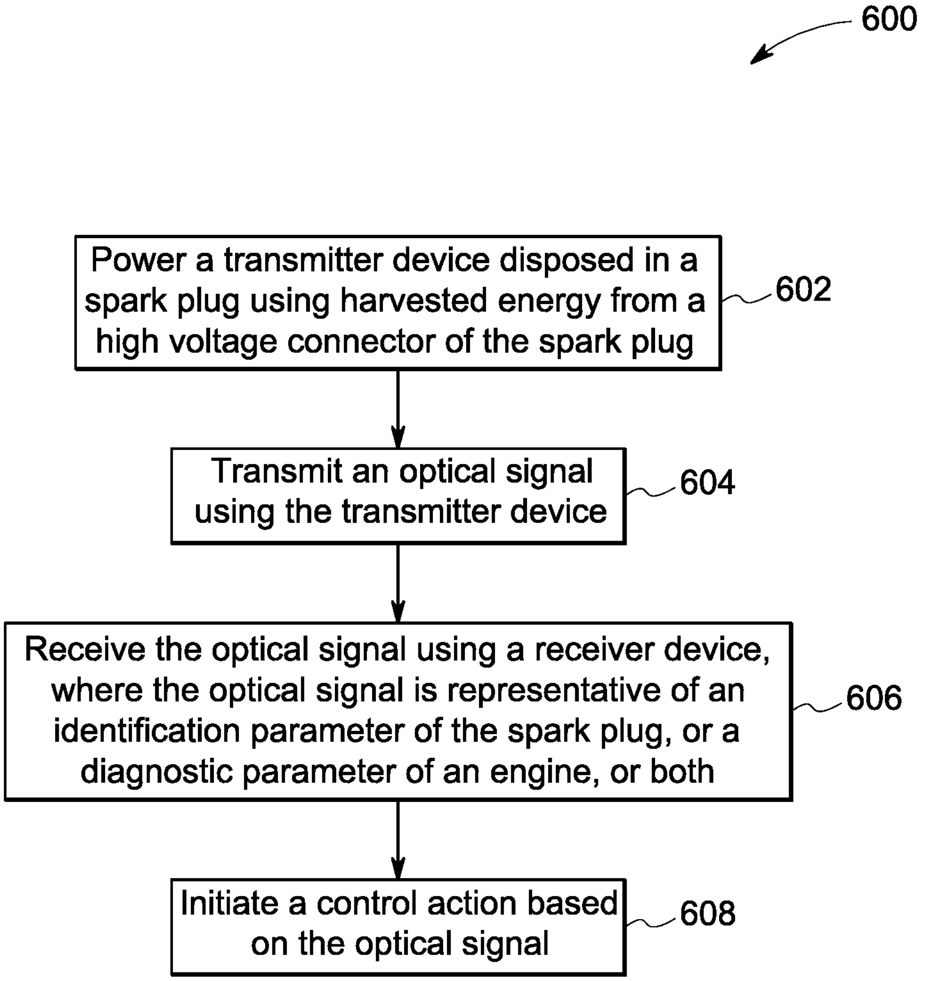

FIG. 5 is a detailed view illustrating electrical circuitry of the spark plug assembly of FIG. 4, in accordance with aspects of the present specification; and FIG. 6 is a flow chart of a method for determining an identification parameter of the spark plug, or a diagnostic parameter of an engine, or both based on an optical signal received from a spark plug assembly, in accordance with aspects of the present specification.

DETAILED DESCRIPTION

Embodiments of the present specification are directed to spark plug assemblies having a spark plug and a detection unit. The spark plug assemblies are configured to be used in engines. By way of example, the spark plug assemblies may be used in an internal combustion engine, a gas engine, or a gas turbine. In a spark plug assembly of the present specification, the detection unit in conjunction with the spark plug is configured to facilitate spark plug identification and/or engine monitoring. By way of example, the detection unit is configured to determine an identification parameter for the spark plug, a diagnostic parameter for an engine, or both. The identification parameter may correspond to a spark plug identification (ID), and the diagnostic parameter may correspond to diagnostic parameters of the engine. In certain embodiments, systems and methods of the spark plug assemblies may be used to determine spark plug specifics, such as, but not limited to, spark plug type, manufacturing date, manufacturer's name, and the like. In one example, the systems and methods of the spark plug assemblies may be used to determine the identification parameter to recognize and report use of a counterfeit spark plug in a spark plug assembly, or to determine use of an authentic spark plug in the spark plug assembly. Further, in some embodiments, the spark plug assembly may facilitate prognosis, diagnosis, or both of an engine in which it is employed. By way of example, one or more diagnostic parameters of the engine may be determined using the spark plug assembly. These diagnostic parameters may be used to prognose and/or diagnose the engine to schedule maintenance, determine leftover run time, determine replacement of certain parts of the engine, and the like.

Figure 1:
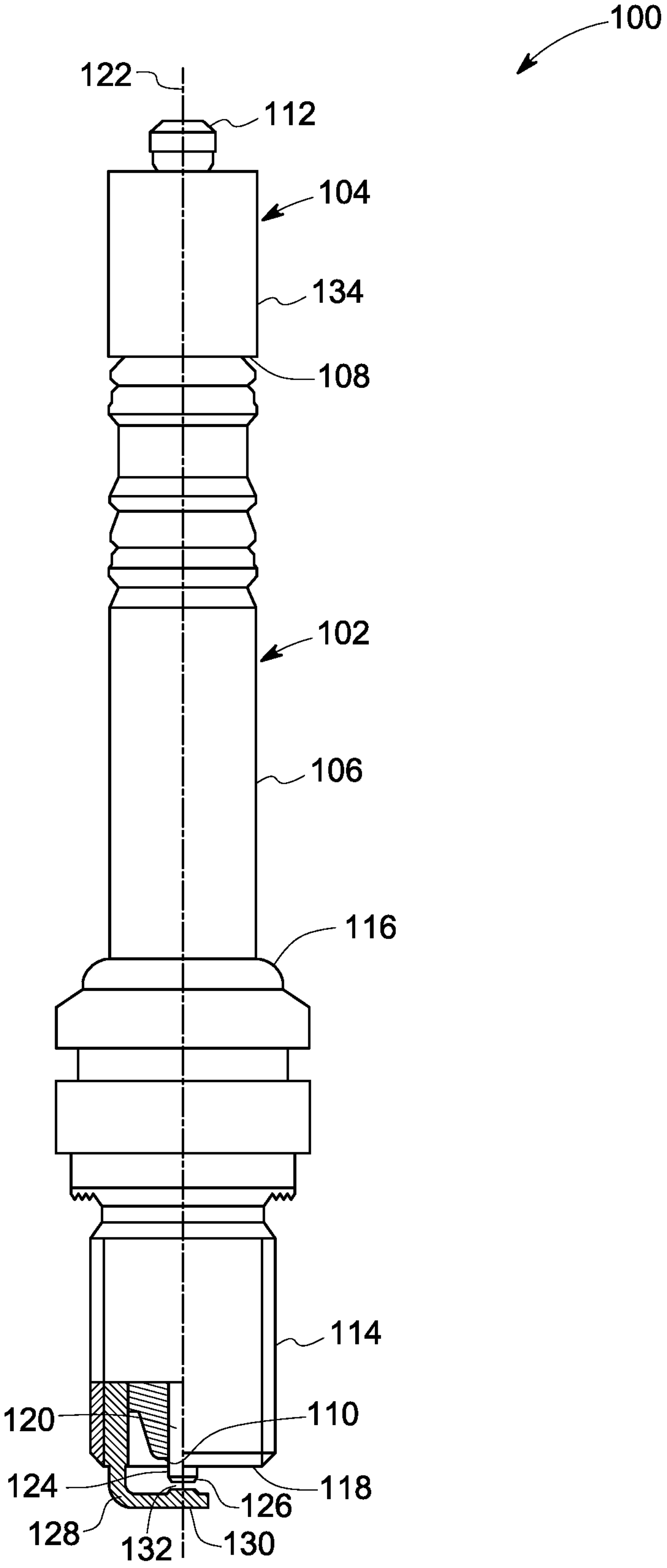
FIG. 1 is a cross-sectional view of a spark plug having a transmitter device, in accordance with aspects of the present specification.

FIG. 1 illustrates a portion of a spark plug assembly 100 of the present specification. The spark plug assembly 100 includes a spark plug 102 and a detection unit 104. The spark plug 102 may be any spark plug that is suitable for use in a given engine. The spark plug 102 includes an insulator body 106 having a first side 108 and a second side 110. The insulator body 106 is coupled to a high voltage connector 112 at the first side 108 of the insulator body 106. The high voltage connector 112 is coupled to an ignition coil (not shown in FIG. 1) of the engine, such as an internal combustion engine, a gas engine, or a gas turbine. The high voltage connector 112 is configured to connect to a high voltage source of the order of few KVs. The spark plug 102 also includes a metallic shell 114 having a first side 116 and a second side 118, where the first side 116 of the metallic shell 114 is coupled to the second side 110 of the insulator body 106. Further, the spark plug 102 includes an electrical conductor 120 at least partly disposed in the insulator body 106 and the metallic shell 114. The electrical conductor 120 is disposed in a core of the spark plug 102 and extends along a longitudinal axis 122 of the spark plug 102. The electrical conductor 120 is disposed between the high voltage connector 112 and a central electrode 124 of the spark plug 102. Particularly, the electrical conductor 120 is housed in the insulator body 106 and the metallic shell 114 and is connected to the high voltage connector 112 at one end and the central electrode 124 at the other end.

The central electrode 124 includes an electrode tip 126. Further, the spark plug 102 includes a ground electrode 128 having a ground electrode pad 130. The ground electrode 128 is mounted on the metallic shell 114 using any suitable technique, such as welding. Moreover, the ground electrode pad 130 of the ground electrode 128 is disposed opposite to the electrode tip 126. A gap, generally represented by reference numeral 132, between the electrode tip 126 and the ground electrode pad 130 defines a spark gap. The spark gap 132 is the spacing between the electrode tip 126 of the central electrode 124 and the ground electrode pad 130 of the ground electrode 128. The spark gap 132 may be measured and adjusted as required to facilitate generation of sparks to fire one or more cylinders in an engine.

Figure 2:
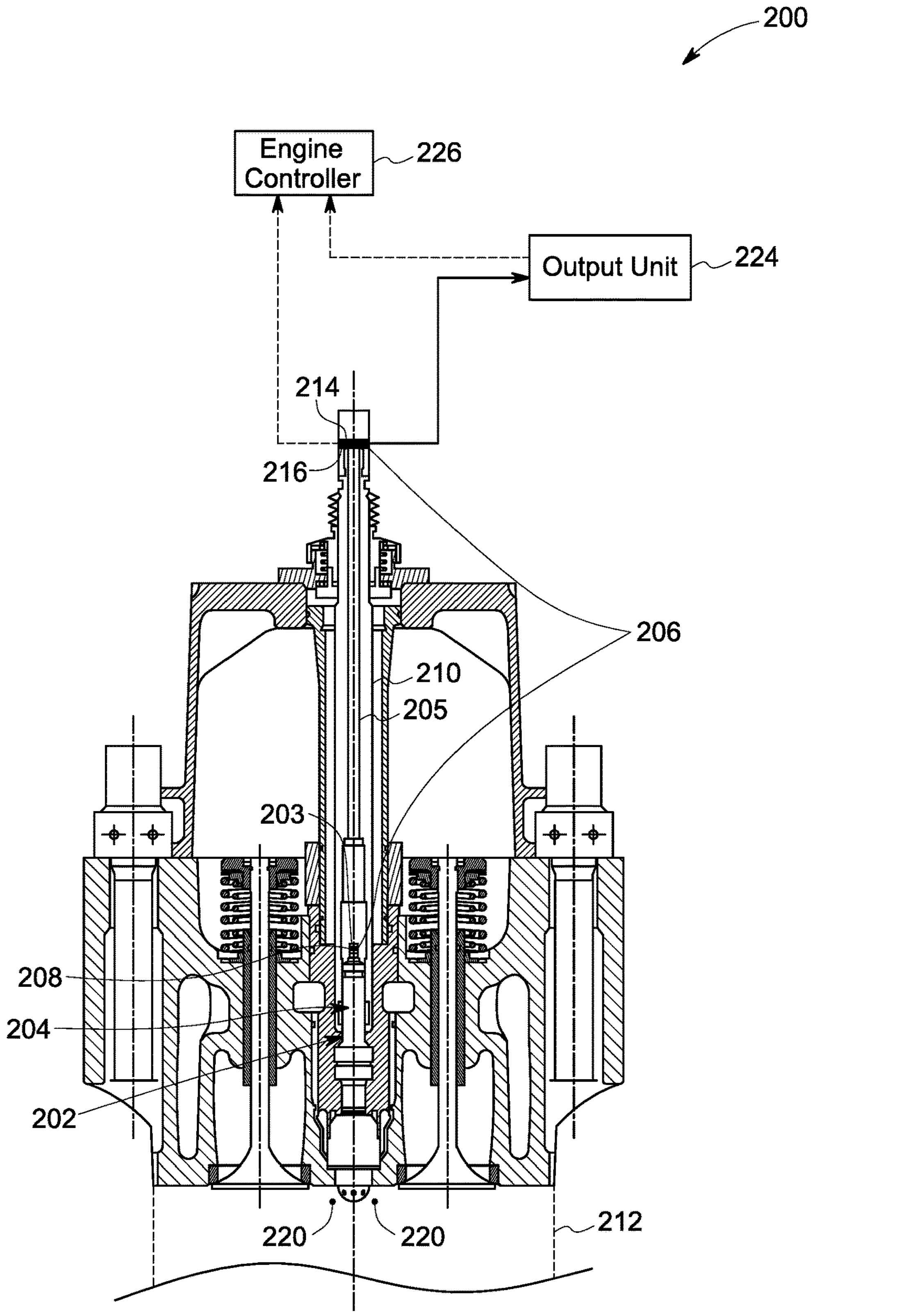
FIG. 2 is a schematic representation of a portion of an engine employing a spark plug assembly, where the spark plug assembly includes a spark plug and a detection unit, in accordance with aspects of the present specification.

The detection unit 104 is used for spark plug identification and/or engine monitoring. By way of example, the detection unit 104 may perform prognostics and/or diagnostics of an engine in which it is employed. The detection unit 104 includes a transmitter device 134 and a receiver device (not shown in FIG. 1). The transmitter device 134 is coupled to the spark plug 102. The receiver device is operatively coupled to the transmitter device 134 and disposed within or outside the engine. In embodiments where the receiver device is disposed within the engine, the receiver device may be disposed in a spark plug connector (as shown in FIG. 2) or the receiver device may be disposed in an ignition coil of the engine (as shown in FIG. 4). In other embodiments, the receiver device may be disposed in any other location in the engine where the receiver device may communicate with the transmitter device 134.

The transmitter device 134 is electrically disposed between the high voltage connector 112 and the electrical conductor 120 of the spark plug 102 via internal electrical circuitry (not shown in FIG. 1) of the spark plug 102. The transmitter device 134 is configured to draw an excitation current from the electrical conductor 120. The excitation current is used to ignite a spark in the spark plug 102. Further, the transmitter device 134 includes an optical signal generator (not shown in FIG. 1) configured to generate an optical signal in response to the drawn excitation current. The transmitter device 134 may also include a coder (not shown in FIG. 1), such as a microcontroller, a field programmable gate array (FPGA), and the like. Further, the optical signal generator is configured to sustain high temperatures with minimal decrease in optical intensity at high temperatures. In some embodiments, the optical signal generator may include one or more light emitting diodes (LEDs). In certain embodiments, the light emitting diode (LED) may be a narrow view angle LED. In one embodiment, the LED may be an ultra-bright LED. In a non-limiting example, the LED may be a red LED, an orange LED, an ultra-bright red LED, an ultra-bright orange LED, or combinations thereof.

In some embodiments, the coder may have a relatively smaller footprint, which is suitable for employing the coder in the transmitter device 134. Moreover, the coder may also have a suitable memory capacity appropriate for high temperature applications having a maximum temperature of 300° C. A non-limiting example of the coder may include a peripheral interface controller (PIC).

FIG. 2 is a cross-sectional view of a portion of an engine 200 employing a spark plug assembly 202, where the spark plug assembly 202 includes a spark plug 204 and a detection unit 206. The detection unit 206 includes a transmitter device 208 and a receiver device 214. The spark plug 204 is coupled to one end 203 of a spark plug connector 205. The transmitter device 208 is disposed in the body of the spark plug 204, while the receiver device 214 is disposed at another end 216 of the spark plug connector 205. The spark plug connector 205 is an electrically insulated channel which is partly disposed in a spark plug sleeve 210, which is a metallic sleeve.

While a side of the spark plug 204 having a high voltage connector (not shown in FIG. 2) is disposed in a spark plug sleeve 210, the other side of the spark plug 204 having the center and ground electrodes (not shown in FIG. 2) is disposed in a combustion chamber 212 of the engine 200. The spark plug sleeve 210 is electrically coupled to an ignition module (not shown in FIG. 2). An ignition coil (not shown in FIG. 2) is disposed between the ignition module and the high voltage connector (not shown in FIG. 2) to connect the spark plug 204 to the ignition module. An electrical cable is disposed in the spark plug connector 205. The ignition coil may be disposed in the spark plug connector 205. In some embodiments, the spark plug connector 205, which is an electrically insulated channel, may also be configured to act as an insulated optical conduit to communicate optical signals from the transmitter device 208 to the receiver device 214. In other embodiments, the insulated optical conduit may be a separate element from the spark plug connector 205. In some of these embodiments, the insulated optical conduit may be disposed inside the spark plug connector 205. Additionally, although not illustrated, in some embodiments, an optical cable may be disposed in the spark plug connector 205 to provide optical communication between the transmitter device 208 and the receiver device 214.

The engine 200 may further include one or more diagnostic sensors, such as sensors 220. The diagnostic sensors 220 may be disposed in the ignition chamber 212 of the engine 200. The diagnostic sensors 220 may be any suitable sensors that are able to withstand harsh engine environments. The diagnostic sensors 220 may be operatively and/or physically coupled to the transmitter device 208 of the detection unit 206. In one example, the diagnostic sensors 220 may be physically wired to the transmitter device 208 using electrical cables. The diagnostic sensors 220 may include one or more of a temperature sensor, a pressure sensor, or a soot sensor. In certain embodiments, the diagnostic sensors 220 may include a negative temperature coefficient (NTC) sensor or a positive temperature coefficient (PTC) sensor. In some examples, the diagnostic sensors 220 may be a NTC or PTC thermistor. Further, the diagnostic sensors 220 may be coupled to the coder and configured to transmit an optical signal using the optical signal generator of the transmitter device 208.

Additionally, the engine 200 may include an output unit 224 coupled to the spark plug assembly 202. The output unit 224 is configured to receive an output signal from the receiver device 214. The output unit 224 may include a display unit, a graphical user interface (GUI), or the like. In some embodiments, the output signal from the receiver device 214 and/or the output unit 224 may be communicated to an engine controller 226. In some of these embodiments, the output unit 224 may be part of the engine controller 226. Based on the output signal received from the receiver device 214, the engine controller 226 may accordingly determine a control action, such as to generate an alarm, continue the operation as is, stall the operation, and the like.

Figure 3:
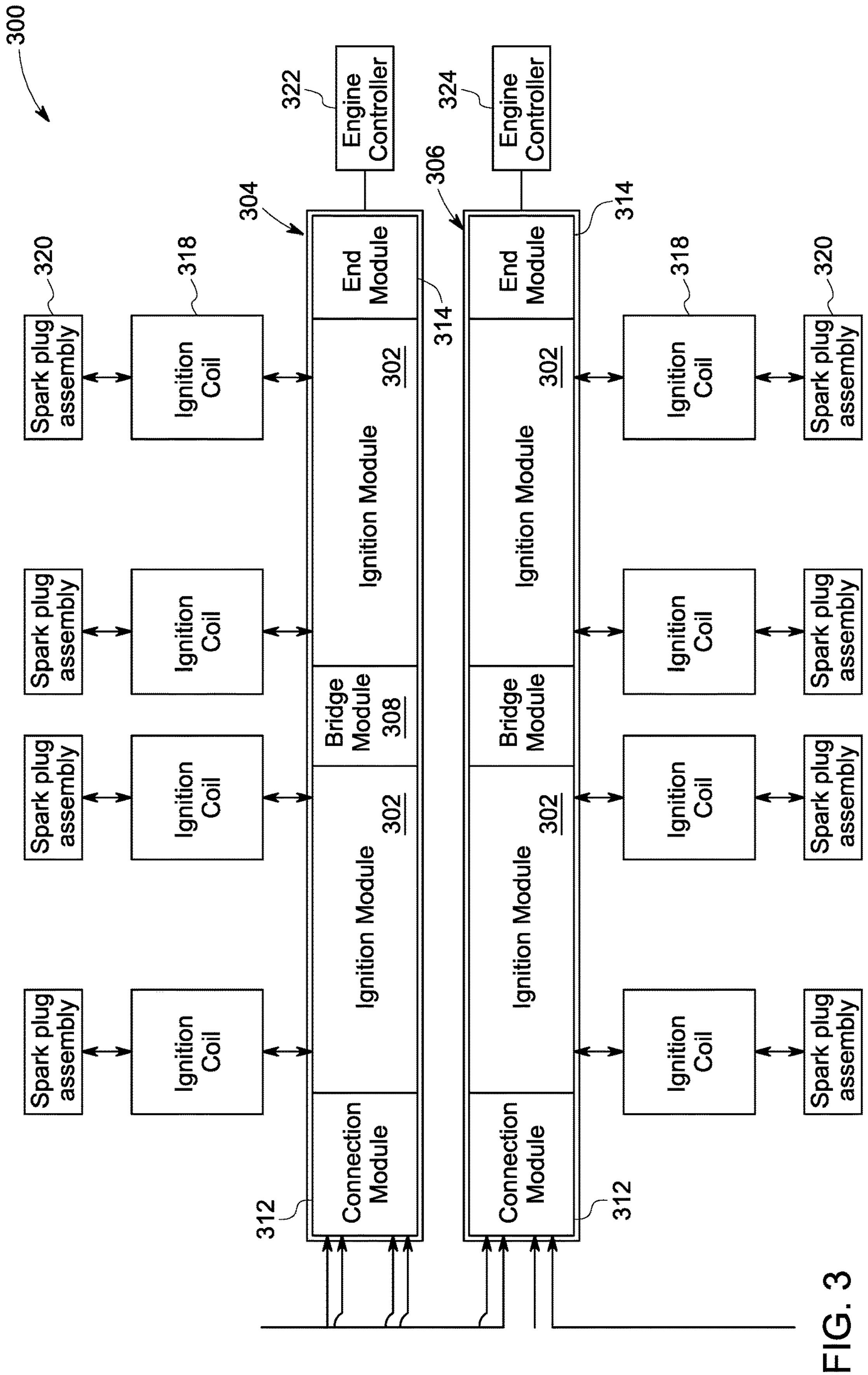
FIG. 3 is a schematic representation of an engine employing one or more ignition modules having one or more ignition coils, and one or more spark plug assemblies coupled to respective ignition coils, where at least one spark plug assembly includes a spark plug and a detection unit, in accordance with aspects of the present specification.

FIG. 3 illustrates an engine 300 employing ignition modules 302. The ignition modules 302 may be operatively coupled to form one or more banks. In the illustrated embodiment, the ignition modules 302 are shown to form two banks, referred generally to as a first bank 304 and a second bank 306.

The ignition modules 302 of individual banks 304 and 306 are coupled using bridge modules 308. The bridge module 308, as the name suggests, bridges power and signal lines and provides a safety signal loop between the various ignition modules 302 of the engine 300. In one example, the power lines may be configured to carry 24 V, and in same or different examples, the signal line may be a controller area network (CAN) bus. Further, the banks 304 and 306 may have connection modules 312 and end modules 314. The connection modules 312 are configured to receive the power and signal lines for connecting to the ignition modules 302, and the end modules are used to close the safety signal loop. Each ignition module 302 includes one or more ignition coils 318. One or more ignition coils 318 in turn are coupled to respective spark plug assemblies 320. The spark plug assemblies 320 include a spark plug (not shown in FIG. 3) and a detection unit (not shown in FIG. 3). A high voltage output of the ignition coil 318 is connected to the spark plug 320 using a high voltage connector (not shown in FIG. 3) of the spark plug 320. Although not illustrated, each ignition module 302 may include semiconductor bridges and at least one controller, where the controller may be configured to use a feedback mechanism to control a voltage applied to a corresponding ignition coil 318 to control the excitation current of an associated spark plug. The ignition module 302 may also house one or more relays or breakers to break a safety signal loop thereby powering down multiple ignition coils 318 to stop the ignition of the engine 300.

The engine 300 may include an internal combustion engine, a gas engine, or a gas turbine. The internal combustion engine may be a vehicle engine. Non-limiting examples of vehicles may include a passenger vehicle, mass transit vehicle, military vehicle, construction vehicle, aircraft, watercraft, and the like.

The engine 300 further includes one or more engine controllers. In the illustrated embodiment, each individual bank 304 and 306 includes respective engine controllers 322 and 324, respectively. The engine controllers 322 and 324 are configured to receive output signals from individual spark plug assemblies 320 and initiate a control action based on the received output signals. In some embodiments, the engine 300 may include a single engine controller for the banks 304 and 306.

Referring now to FIGS. 4 and 5, alternative embodiments of spark plug assemblies are illustrated. A spark plug assembly 400 of FIG. 4 employs an insulated optical conduit for operatively coupling the transmitter and receiver devices, while a spark plug assembly 500 of FIG. 5 employs an optical cable for operatively coupling the transmitter and receiver devices.

FIG. 4 illustrates the spark plug assembly 400 having a spark plug 402 and a detection unit 404. The detection unit 404 includes a transmitter device 406 and a receiver device 408. The transmitter device 406 of the detection unit 404 is coupled to the spark plug 402, and the receiver device 408 of the detection unit 404 is coupled to an ignition coil 410 and an ignition module 411 of an engine (not shown in FIG. 4). The ignition coil 410 is coupled to the spark plug 402 via an electrical conductor 412. The transmitter device 406 is coupled to the spark plug 402 such that the transmitter device 406 is electrically disposed between a high voltage connector (not shown in FIG. 4) and the electrical conductor 412 of the spark plug 402. Disposing the transmitter device 406 between the high voltage connector and the electrical conductor 412 enables the transmitter device 406 to draw an excitation current from the electrical conductor 412. In addition to being configured to draw the excitation current from the electrical conductor 412, the transmitter device 406 is also configured to generate optical signals in response to the drawn excitation current. The optical signals are generally represented by reference numeral 414.

Although not illustrated in FIG. 4, in certain embodiments, the transmitter device 406 includes elements such as an optical signal generator, a coder, and an energy storage device. The transmitter device 406 may include one or more of each of the elements. Further, in certain embodiments, the transmitter device 406 includes a high temperature circuit board. In one example, the transmitter device 406 includes a high temperature printed circuit board (PCB). In a non-limiting example, the transmitter device 406 may include two or more optical signal generators or two or more energy storage devices. In a non-limiting example, the transmitter device 406 may employ two LEDs of different wavelengths as the optical signal generator.

In the illustrated embodiment of FIG. 4, the transmitter device 406 and the receiver device 408 are held in operative and communicative association via an insulated optical conduit 416. The insulated optical conduit 416 may also house the electrical conductor 412. The insulated optical conduit 416 has a first end 418 and a second end 420. The receiver device 408 may be disposed closer to the first end 418 of the insulated optical conduit 416. In one example, the receiver device 408 may be at least partly disposed at the first end 418 of the insulated optical conduit 416. Further, at the second end 420, the insulated optical conduit 416 may be coupled to the transmitter device 406. At least a portion of an internal surface 422 of the insulated optical conduit 416 is optically reflective. The insulated optical conduit 416 enables the optical signals 414 to traverse from the transmitter device 406 to the receiver device 408. Specifically, the optically reflective internal surface 422 of the insulated optical conduit 416 facilitates traversal of the optical signals 414 from the transmitter device 406 toward the receiver device 408.

The receiver device 408 includes an optical sensor 424. The optical sensor 424 is coupled to a controller, generally represented by reference numeral 426. The controller 426 may or may not be a part of the receiver device 408. As illustrated in FIG. 4, in some embodiments, the optical sensor 424 is disposed in the ignition coil 410. In some of these embodiments, the optical sensor 424 of the receiver device 408 may be coupled to the transmitter device, such as the transmitter device 406, using an optical cable (not shown in FIG. 4). Further, the controller 426 may be a decoder, a microcontroller, an engine controller, or combinations thereof. In embodiments where the controller 426 is a microcontroller or a decoder, the controller 426 may be part of the receiver device 408 or the engine controller. Moreover, when deployed, the decoder or the microcontroller may be coupled to and in communication with the engine controller of the engine.

Turning now to FIG. 5, a spark plug assembly 500 includes a spark plug 502 and a detection unit 504. The detection unit 504 includes a transmitter device 510 and a receiver device 512. An ignition coil 506 of an engine is coupled to the spark plug 502 using an electrical conductor 508. The electrical conductor 508 is also coupled to the transmitter device 510. Further, in the illustrated embodiment, the transmitter device 504 is coupled to the receiver device 512 using an optical cable 514. The transmitter device 510 includes an optical signal generator 516, a coder 518, and an energy storage device 520. In the illustrated embodiment, the energy storage device 520 is coupled to the coder 518, and the coder 518 in turn is coupled to the optical signal generator 516. The voltage limiting device, such as a Zener diode 521, is used to limit the voltage across the energy storage device 520 and bypass the excitation current when a determined voltage limit is achieved across the energy storage device 520. The transmitter device 510 is configured to draw the excitation current from the electrical conductor 508. The excitation current may be drawn by the transmitter device 510 from the electrical conductor 508 at regular intervals or irregular intervals. In some embodiments, the step of drawing the excitation current may be synchronized with spark events of the engine. In some other embodiments, the step of drawing the current may not be dependent on the spark events. The energy storage device 520 stores energy obtained from the drawn excitation current. Based on an identification parameter and/or diagnostic parameters, the coder 518 is configured to excite the optical signal generator 516 using the energy stored in the energy storage device 520. Upon excitation, the optical signal generator 516 generates optical signals 522 representative of the identification parameter and/or diagnostic parameters. Diagnostic sensors from the engine (not shown in FIG. 5) may be coupled to the coder 518 for optically transmitting the diagnostic parameters. The optical signals 522 are communicated from the transmitter device 510 to an optical sensor 524 of the receiver device 512 using the optical cable 514. The optical signals 522 may be transmitted at predefined, frequent, regular, or irregular intervals. The optical cable 514 is selected based on for example, a wavelength of the optical signals 522. In one embodiment, the controller represented by reference numeral 526 may be a part of the receiver device 512. By way of example, the controller 526 may be a decoder that together with the optical sensor 524 may form the receiver device 512. In another embodiment, the controller 526 may be an engine controller.

In certain embodiments, the detection unit, such as the detection unit 104 of FIG. 1, detection unit 206 of FIG. 2, detection unit 404 of FIG. 4, detection unit 504 of FIG. 5 may form a kit. The kit may be retrofitted in existing engines or may be installed in newly manufactured engines or spark plugs. By way of example, the kit may be installed in an engine by a service provider when the engine is brought in for servicing. In another example, the detection unit may be factory fitted in an engine during or after manufacturing and/or assembling of the engine. The kit having the detection unit includes a transmitter device configured to be coupled to a spark plug, where the transmitter device is configured to be electrically disposed between an electrical conductor and a high voltage connector. Further, the transmitter device is configured to generate an optical signal in response to the drawn excitation current.

FIG. 6 is a flow chart 600 for a method for identification of a spark plug and/or for monitoring operation of an engine. The method of the flow chart 600 may be used for generating a control action based on an identification parameter of the spark plug, or a diagnostic parameter of an engine, or both.

The identification and/or diagnostic parameters are determined based on an optical signal received from a spark plug assembly.

At step 602, a transmitter device disposed in the spark plug of the spark plug assembly is powered using a portion of an excitation current. The excitation current is the electrical current that is used to ignite a spark in the spark plug. In some embodiments, a portion of the excitation current being carried by an electrical conductor of the spark plug is drawn or harvested by the transmitter device. The harvested electrical energy is used to power the transmitter device. Specifically, the drawn excitation current is used to charge an energy storage device of the transmitter device. Subsequently, the energy stored in the energy storage device is used by a coder of the transmitter device to excite an optical signal generator of the transmitter device to generate optical signals representative of identification and/or diagnostic parameters. Particularly, a determined amount of current is drawn from the energy storage device by the coder to excite the optical signal generator to generate an optical signal representative of the identification and/or diagnostic parameters.

In certain embodiments, the step of drawing the portion of the excitation current is synchronized with the spark events of an engine. In these embodiments, the identification parameter, diagnostic parameter, or both may be monitored during the spark events. In certain other embodiments, the step of drawing the portion of the excitation current is performed independent of the spark events of the engine. In some of these embodiments, the diagnostic parameters of the engine may be determined using one or more electrical parameters. In one example, a voltage may be sensed across a diagnostic sensor, such as, but not limited to, a NTC or PTC sensor, an analog or digitized value, of the voltage may be communicated to the receiver device via the transmitter device. Digitization of the analog value may be performed by a coder. Further, a table, such as a look-up table, may be used to determine a relation between the sensed voltage and one or more diagnostic parameters, such as a voltage, temperature, and the like.

At step 604, an optical signal is generated using the coder and the optical signal generator of the transmitter device. Further, the optical signal is transmitted using the transmitter device and one or both of an insulated optical conduit or an optical cable.

Further, at step 606, the optical signal is received using a receiver device, where the optical signal is representative of an identification parameter of the spark plug, or a diagnostic parameter of an engine, or both. The identification parameter of the spark plug is generally representative of the identification number of the spark plug. The diagnostic parameter of the engine is representative of one or more of a temperature, pressure, or soot composition.

At step 608, a control action is determined based on the optical signal and the control action is initiated for the engine based on the identification parameter, diagnostic parameter, or both. In some embodiments, the diagnostic parameters may be provided as an input to the engine controller and based on the diagnostic parameters the engine controller may determine the control action. Non-limiting examples of the control action may include generating an alarm signal, shutting down the engine, maintaining status quo, such as for example, continuing to power the engine or run the engine, predicting health of the engine, scheduling maintenance of the engine, or combinations thereof. By way of example, an alarm may be generated based on the identification parameter, diagnostic parameter, or both.

In some embodiments, initiating the control action may include logging in the identification parameter of the spark plug in an engine data log registry, and continuing or discontinuing engine operations accordingly. In same or different embodiments, initiating the control action may include logging in the identification parameter of the spark plug in an engine data log registry. In instances where the spark plug is not a valid spark plug, the log entry may be a blank registry. An entry may be made in the engine log registry for every instance when the engine is started. In certain embodiments, initiating the control action may include displaying or communicating the identification parameter, diagnostic parameters, or both to an output device and/or the engine controller.

Advantageously, identification of the authentic spark plug identification allows optimization of the engine performance, while minimizing risk of damage to the engine that may be otherwise caused due to, for example, use of counterfeit spark plugs in an engine. The systems and methods may also be used to monitor the engine performance during operation using the diagnostic parameters in a periodic or intermittent fashion. In addition to providing a control action, monitoring the engine performance may also result in timely prognosis and/or diagnosis, thereby providing an opportunity to timely schedule a maintenance event, prepare a predictive maintenance chart, provide recommendation for part replacement, provide recommendation for part service, and the like.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A spark plug assembly, comprising:

a spark plug, wherein the spark plug comprises:

a high voltage connector disposed at one end of the spark plug;

an insulator body having a first side and a second side, wherein the insulator body is coupled to the high voltage connector at the first side;

a metallic shell having a first side and a second side, wherein the first side of the metallic shell is coupled to the second side of the insulator body;

an electrical conductor at least partly disposed in the insulator body and the metallic shell;

a detection unit, comprising:

a transmitter device directly coupled to the spark plug at an axial position between axially opposite ends of the spark plug, wherein the transmitter device is configured to draw an excitation current from the electrical conductor, and wherein the transmitter device comprises an optical signal generator, wherein the optical signal generator is configured to generate an optical signal in response to the drawn excitation current.

2. The spark plug assembly of claim 1, wherein the transmitter device further comprises a coder and an energy storage device.

3. The spark plug assembly of claim 2, wherein the energy storage device is coupled to the coder, and the coder is coupled to the optical signal generator.

4. The spark plug assembly of claim 1, wherein the optical signal generator is a light emitting diode.

5. The spark plug assembly of claim 1, further comprising:

a receiver device disposed in optical communication with the transmitter device and configured to receive the optical signal from the transmitter device, wherein the receiver device comprises an optical sensor coupled to a controller; and an optical cable coupled to the transmitter and receiver devices, wherein the optical cable is configured to transmit the optical signal from the transmitter device to the receiver device.

6. The spark plug assembly of claim 1, wherein the transmitter device is disposed in the axial position between the high voltage connector and the insulator body of the spark plug.

7. An engine, comprising:

one or more ignition modules comprising one or more ignition coils;

one or more spark plug assemblies, wherein the one or more spark plug assemblies are coupled to respective ignition coils, and wherein at least one of the one or more spark plug assemblies comprises:

a spark plug, wherein the spark plug comprises:

a high voltage connector disposed at one end of the spark plug;

an insulator body having a first side and a second side, wherein the insulator body is coupled to the high voltage connector at the first side;

a metallic shell having a first side and a second side, wherein the first side of the metallic shell is coupled to the second side of the insulator body;

an electrical conductor at least partly disposed in the insulator body and the metallic shell;

a detection unit, comprising:

a transmitter device directly coupled to the spark plug at an axial position between axially opposite ends of the spark plug, wherein the transmitter device is configured to draw an excitation current from the electrical conductor, wherein the transmitter device comprises an optical signal generator, and wherein the optical signal generator is configured to generate an optical signal in response to the drawn excitation current.

8. The engine of claim 7, further comprising an engine controller, wherein the engine controller is configured to control operation of the engine, the one or more ignition modules, the one or more spark plug assemblies, or combinations thereof wherein the optical signal comprises a spark plug identification (ID) of the spark plug and a diagnostic parameter.

9. The engine of claim 7, wherein the engine comprises an internal combustion engine, a gas engine, or a gas turbine.

10. The engine of claim 8, further comprising one or more diagnostic sensors, wherein the diagnostic sensors are coupled to the transmitter device.

11. The engine of claim 7, further comprising a receiver device disposed in optical communication with the transmitter device and configured to receive the optical signal from the transmitter device, wherein the receiver device is disposed in an ignition coil of the at least one of the one or more ignition modules.

12. The engine of claim 7, wherein a receiver device of a spark plug assembly of the one or more spark plug assemblies is configured to receive optical signals from transmitter devices of at least one other spark plug assembly of the one or more spark plug assemblies.

13. The engine of claim 7, further comprising a spark plug connector comprising an insulated optical conduit having a first end and a second end, and a receiver device disposed in optical communication with the transmitter device and configured to receive the optical signal from the transmitter device, wherein the receiver device is disposed at the first end of the insulated optical conduit.

14. The engine of claim 7, wherein the transmitter device is disposed in the axial position between the high voltage connector and the insulator body of the spark plug.

15. The engine of claim 7, wherein the transmitter device further comprises a coder and an energy storage device.

16. A method, comprising:

powering a transmitter device disposed in a spark plug using harvested energy from an electrical conductor of the spark plug;

transmitting an optical signal using the transmitter device;

receiving the optical signal using a receiver device, wherein the optical signal is representative of an identification (ID) parameter of the spark plug;

determining a control action based on the optical signal; and initiating the control action for the engine.

17. The method of claim 16, wherein the step of initiating the control action comprises logging in the identification parameter of the spark plug and a diagnostic parameter of an engine in an engine data log registry, wherein the identification (ID) parameter comprises an identification number of the spark plug.

18. The method of claim 16, wherein powering the transmitter device comprises:

drawing a portion of the excitation current from an electrical conductor of the spark plug, wherein the step of drawing the portion of the excitation current is performed independent of spark events or synchronized with the spark events; and exciting an optical signal generator to generate the optical signal.

19. The method of claim 16, wherein the transmitter device further comprises a coder and an energy storage device.

20. A system, comprising:

a detection unit, wherein the detection unit comprises:

a transmitter device configured to be directly coupled to a spark plug at an axial position between axially opposite ends of the spark plug, wherein the transmitter device comprises an optical signal generator, a coder, and an energy storage device, and wherein the optical signal generator is configured to generate an optical signal in response to an excitation current.

21. The system of claim 20, comprising the spark plug having the transmitter device.

22. The system of claim 20, wherein the optical signal includes a spark plug identification (ID) of the spark plug and a diagnostic parameter.

23. The system of claim 20, wherein the detection unit comprises a receiver device configured to be disposed in optical communication with the transmitter device, wherein the receiver device is configured to receive the optical signal from the transmitter device.

* * * * *